COLOR TELEVISION SIGNAL CONVERSION SYSTEM

Filed Aug. 19, 1953 4 Sheets-Sheet 1

INVENTOR
Peter C. Goldmark
BY
Pennie, Edmonds, Morton, Barrows & Taylor
ATTORNEYS Jan. 13, 1959 P. C. GOLDMARK 2,868,870

COLOR TELEVISION SIGNAL CONVERSION SYSTEM

Filed Aug. 19, 1953 4 Sheets-Sheet 2

INVENTOR
Peter C. Goldmark
BY
Pennie, Edmonds, Morton, Barrows & Taylor
ATTORNEYS Jan. 13, 1959 P. C. GOLDMARK 2,868,870

COLOR TELEVISION SIGNAL CONVERSION SYSTEM

Filed Aug. 19, 1953 4 Sheets-Sheet 3

INVENTOR
Peter C. Goldmark
BY
Pennie, Edmonds, Morton, Barrows & Taylor
ATTORNEYS Jan. 13, 1959 P. C. GOLDMARK 2,868,870

COLOR TELEVISION SIGNAL CONVERSION SYSTEM

Filed Aug. 19, 1953 4 Sheets-Sheet 4

INVENTOR
Peter C. Goldmark
BY
Pennie, Edmonds, Morton, Barrows & Taylor
ATTORNEYS United States Patent Office 2,868,870 Patented Jan. 13, 1959

2,868,870

COLOR TELEVISION SIGNAL CONVERSION SYSTEM

Peter C. Goldmark, New Canaan, Conn., assignor to Columbia Broadcasting System, Inc., New York, N. Y., a corporation of New York Application August 19, 1953, Serial No. 375,219

16 Claims. (Cl. 178—5.2)

This invention relates to color television, and particularly to pickup equipment for scanning an object field and developing color video signals corresponding thereto. In accordance with specific aspects of the invention, apparatus is provided for the sequential scanning of an object field and conversion of the resulting sequential color video signal into signals suitable for use in the so-called NTSC type of signal wherein luminance and color information are transmitted on separable carrier and subcarrier waves.

A large number of color television systems have been proposed in the past. One broad class is of the sequential type. In this class signals representing different color aspects of the object field are transmitted sequentially in regularly recurring sequence, and reproduced sequentially at the receiver. The sequential alternation of color signals may occur at field, line or dot frequency, and persistence of vision is relied upon at the receiver to fuse the successively reproduced color components into a complete picture in natural color.

One system of this class which has given excellent results in practice is the field sequential system. This system is described in an article entitled "Color Television—USA Standard," by Goldmark, Christensen and Reeves, Proceedings of the I. R. E., October, 1951, pages 1288–1313. As specifically described therein, a double-interlaced scanning pattern is employed and successive fields correspond to red, blue and green aspects of the object field in regularly recurring sequence. The specific standards described therein include 144 field scansions per second, double-interlaced, with 405 lines per frame. The field frequency is considerably higher than the conventional standard black-and-white field frequency of 60 fields per second, in order to avoid color flicker and other effects. The system has the important advantage that it is possible to employ a single scanning device in the camera, with an associated color filter device for presenting different primary color aspects of the object field to the camera in succession. The employment of a single scanning device, with a single set of deflection coils and waves, avoids any problems of misregistration which are present in many proposed color television systems.

Another broad class of color television systems is of the simultaneous type in which a plurality of color aspects of an object field, usually three, are transmitted simultaneously and reproduced simultaneously. Separate carrier, or carrier and sub-carrier, arrangements have customarily been proposed for the radio transmission. Since the different color aspects of the object field, say red, green and blue, must be scanned and transmitted simultaneously, a plurality of scanning devices have commonly been suggested. Thus problems of registration, that is, exact matching of the scanning patterns in size and linearity at the camera, are presented. Even with the utmost care, the closeness of registration obtainable in practice leaves much to be desired, and involves careful design, construction and maintenance.

For several years the NTSC (National Television System Committee) has been working on color television standards, and has proposed standards wherein the so-called luminance of the object field is transmitted as amplitude modulation of the transmitted carrier, and two additional signals containing color information (so-called chrominance components) are transmitted on a sub-carrier in phase quadrature lying within the normal television video band, but being an odd multiple of one-half the line deflection frequency. A description of the NTSC color signal standards is included in an article entitled "Generation of NTSC Color Signals" by Fisher, Proceedings of the I. R. E., March 1953, pages 338–343.

In this NTSC system the generation and transmission of the luminance signal is intended to permit conventional black-and-white television receivers to reproduce satisfactory pictures in monochrome. Thus the field and line frequencies are substantially the same as in standard monochrome transmission, the latter being 60 fields per second, double-interlaced, with 525 lines per frame. The luminance signal actually consists of a combination of red, blue and green components whose ratios are selected to give a satisfactory monochrome picture on conventional black-and-white receivers. At the present time the luminance signal is designated Y and the corresponding signal voltage is given by the expression:

$$E_Y'=0.59\,E_G'+0.30\,E_R'+0.11\,E_B'$$

In this expression the components $E_G'$, $E_R'$, $E_B'$ represent gamma corrected voltages corresponding to green, red and blue signals during the scanning of a given picture element.

The signals representing the color information are in themselves combinations of the several primary colors and have been denoted I and Q. The corresponding voltages are given by the following:

$$E_I'=0.74(E_R'-E_Y')-0.27(E_B'-E_Y')$$
$$E_Q'=0.48(E_R'-E_Y')+0.41(E_B'-E_Y')$$

The specific proportions of the primary color components in the Y, I and Q signals have been selected so that, after the signals have been separated at a receiver, they may be combined by simple addition and subtraction circuits to yield red, blue and green components for reproduction. While the Y signal is transmitted at full video band width (normally four megacycles at the present time), the I signal is passed through a low-pass filter which eliminates frequencies above about 1.5 megacycles, and the Q signal is passed through a low-pass filter which eliminates frequencies above about 0.5 megacycle. Thus, in color reproduction, the luminance or Y signal is relied upon primarily for the reproduction of fine detail, and the I and Q signals are utilized to supply proper color components for reproduction of full color pictures. The transmission of the I and Q signals in phase quadrature on a sub-carrier of proper frequency results in substantial cancelling of the signals when received on a conventional black-and-white receiver, while the Y signal is reproduced in normal manner.

Camera arrangements for developing the NTSC signals described above have commonly involved the use of three separate scanning devices in conjunction with suitable optical arrangements for scanning three images of one object field at the same time. Thus, registration problems are presented which are difficult to solve and involve expensive camera equipment and careful maintenance. Furthermore, any misregistration affects the quality of the Y signal, since that signal is composed of portions of each of the color signals. Thus, misregistration affects not only the quality of a color picture reproduced on a color television receiver, but also the detail and quality of the picture when reproduced in monochrome on a conventional black-and-white receiver.

It is a primary object of the present invention to provide a camera and associated equipment which enables the use of a single scanning device in the camera itself, and effects conversion into an NTSC or similar type signal in such a manner that the Y signal components are obtained by a single scanning device at each stage in the procedure. In this manner, no deterioration of the Y signal can result from misregistration. Also the camera unit itself is much simpler, cheaper, and easier to maintain.

Broadly, in accordance with the invention, a sequential color pick-up camera is employed to scan the object field, the camera being advantageously of the field sequential type operating at a field frequency much higher than that of the ultimate NTSC signal. A signal converter is then employed including means for reproducing images from the sequential color video signal and a plurality of pick-up scanning devices associated with the signal reproducing means for producing video signals therefrom. Switching means are employed so that different scanning devices in the signal converter scan images representing different color components to develop corresponding color signals. The images to which one of the pick-up scanning devices responds include a plurality of color components, and advantageously all three color components whose relative intensities have been altered so that the resulting output signal has the proper proportions for the Y signal.

Certain embodiments employ storage tubes of the image orthicon type and others employ storage tubes of the vidicon type. With proper selection of the decay characteristics of the signal reproducing means in the signal converter, satisfactory results can be obtained with either type of tube. However, the difference in storage characteristics of image orthicons and vidicons permits the use of different specific systems which have different advantages.

The signal converter portion of the apparatus involves the rescanning of images produced by a scanning process from the initial sequential color signal. In some cases this results in beating and moire effects between the two scanning patterns when both patterns have lines extending in the same direction. Accordingly, in accordance with one aspect of the invention, the initial scanning of the object field is with lines extending in a different direction from that of the pickup tubes in the signal converter. Advantageously the initial scanning is with lines in the vertical direction and subsequent rescanning with lines in the horizontal direction.

Other objects and features of the invention will in part be pointed out, and in part be evident, in the discussion of the specific embodiments given hereinafter.

The invention will be more fully understood by reference to the following description of specific embodiments thereof, taken in conjunction with the drawings in which.

Figures 1, 2:
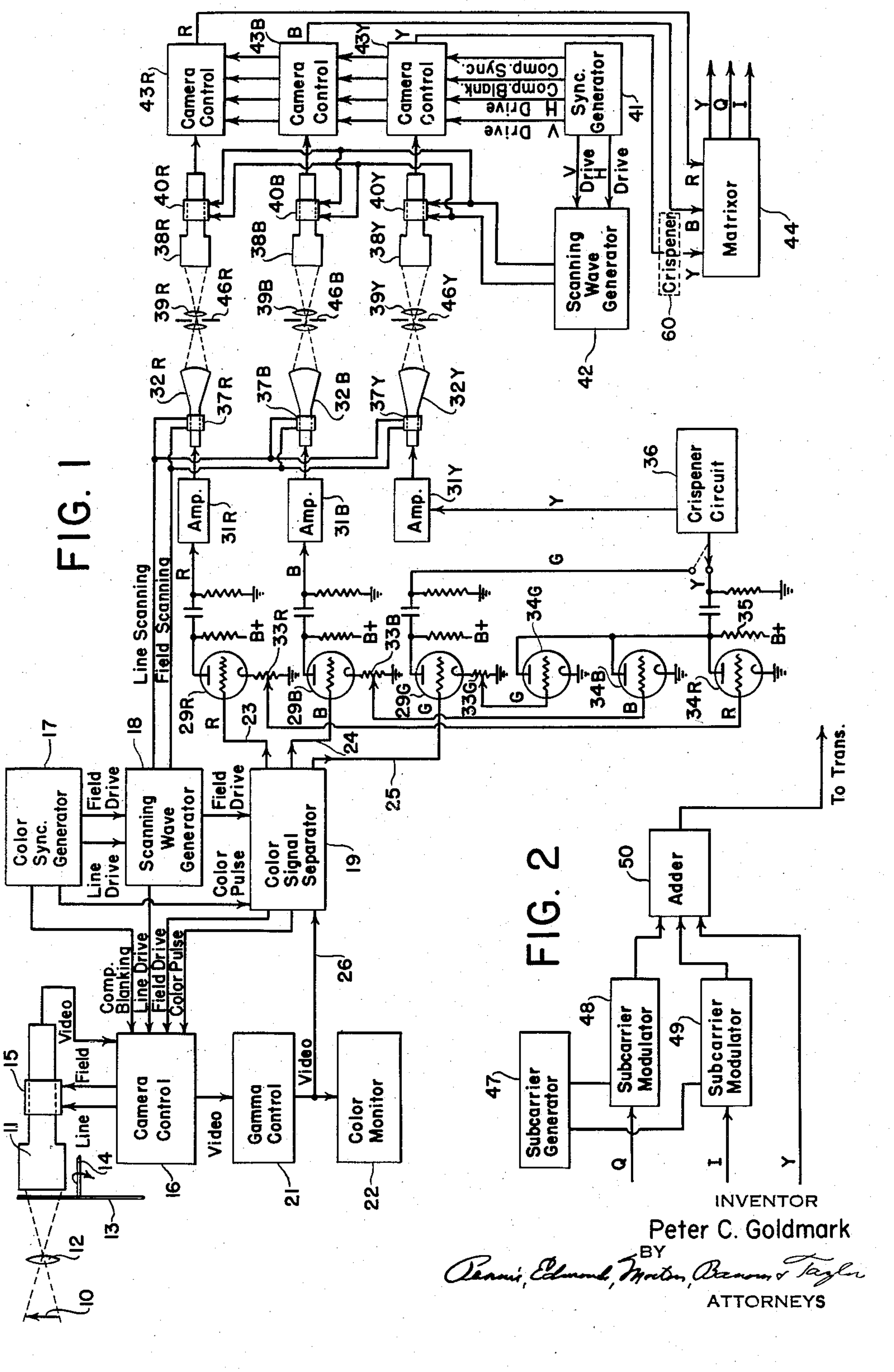
Fig. 1 is a diagram illustrating one embodiment of the invention.
Fig. 2 is a detail block diagram of a modulation arrangement suitable for use with the apparatus of Fig. 1.

Referring now to Fig. 1, an object field 10 is scanned by a color television camera of the sequential type. As here shown the camera includes a scanning device 11 of the image orthicon type with a cooperating lens 12 which focuses images of object field 10 on the light sensitive surface of scanning tube 11. In the path of the light to the scanning tube 11 is interposed a color filter device to present different color aspects of the object field to the scanning device in sequence. The color filter device is here shown as a disc 13 rotating about the axis 14, the disc having one or more sets of color filters arranged around the periphery thereof so that as the disc rotates different color filters are interposed in the path of light to tube 11. The color filter disc may have filter segments shaped in accordance with my Patent No. 2,304,081, issued December 8, 1942, or may be a drum arrangement as described in my Patent No. 2,435,963, issued February 17, 1948. Other forms of color filter devices may be employed if desired.

The scanning beam in tube 11 is deflected in line and field directions by a suitable scanning yoke 15 energized with respective sawtooth waves from camera control unit 16. In the specific arrangement shown the camera is of the field sequential type and the color disc is rotated in synchronism with the field scansions so that the color changes from one field scansion to the next. Double-interlaced scansion and three primary colors may be employed in accordance with the principles set forth in my Patent No. 2,480,571, granted August 30, 1949.

In order to obtain synchronization of the camera and associated units a color synchronizing generator 17 is provided which generates line and field drive pulses of suitable periodicity. In one specific apparatus which has been operated with success the field scansion is 180 fields per second and the line scansion is 47,250 cycles per second in order to produce a 525 line double-interlaced scanning pattern. In order to maintain proper color synchronization, the generator 17 also produces distinctive color synchronizing pulses which recur at the frequency of a selected color, say red. Thus the color pulses have a frequency of 15,750 pulses per second. The generator 17 also produces a composite line and field blanking signal in accordance with usual practice.

The line drive pulses are supplied from generator 17 via scanning wave generator 18 to the camera control unit 16 as indicated by the labeled lines. Line deflecting sawtooth waves are produced in unit 16 and supplied to the deflection yoke 15 of the camera tube 11. Field drive pulses are supplied from generator 17 via generator 18 and color signal separator 19 to the unit 16 as indicated by the labeled lines. Field deflection sawtooth waves are produced in unit 16 and supplied to deflection yoke 15. Of course, the line and field drive pulses could be supplied directly from generator 17 to unit 16 if desired.

The color and density of the filters in disc 13 are selected, in conjunction with the spectral characteristic of camera tube 11, to yield color signal components of such character that when the color picture is eventually reproduced at a receiver it will have the necessary fidelity. Color standards are commonly specified in transmission standards and the filters are chosen accordingly, as is understood in the art. Commonly they are selected so that when the camera is scanning a specified white object field, signal voltages of equal amplitude are obtained for the several color components.

In practice a given camera may be employed with different sources of light which have different spectral characteristics, and replacement camera tubes may have somewhat different spectral characteristics. Accordingly, it is advantageous to employ means for altering the relative magnitudes of the successive color components in the sequential video signal in accordance with the principles described in my Patent 2,406,760 issued September 3, 1946. Such a unit has been termed a color mixer and may be included in camera control unit 16. In order to permit proper synchronization of the color mixer, color synchronizing pulses from generator 17 are supplied to unit 16 via separator 19, as indicated by the labelled lines.

For convenience the color synchronizing generator 17 may be synchronized with the 60-cycle power line so that the field frequency is an exact multiple of the 60-cycle power. A synchronous motor (not shown) may be used to drive shaft 14 of the color disc so that the disc will rotate in synchronism with the field scansions. Provision is made for controlling the phase of the rotating disc with respect to the 60-cycle mains so that the proper phase may be maintained between the color segments of the disc and the corresponding field scansions. These features are now well known and detailed apparatus is described in the Goldmark et al. article supra. If desired, however, any suitable construction may be employed as is understood in the art.

The sequential color video signal developed by camera tube 11 is supplied to the camera control unit 16 as indicated, and combined with the composite line and field blanking wave from generator 17. Thence the video signal is supplied to the gamma control unit 21 whose output is fed to a color monitor 22. The color monitor is advantageously a field sequential color television unit operating at 525 lines and 180 fields per second, so that the sequential signal is reproduced in natural color.

The sequential color video signal is also supplied from the output of the gamma control unit to the color signal separator 19. The separator 19 contains circuits for separating portions of the sequential signal representing one color from those representing another color, so that the output lead 23 contains only the red components of the video signal, the output lead 24 contains only the blue components and the output lead 25 contains only the green components. Switching circuits suitable for the color separator 19 are now well known in the art and need not be described in detail. As an example, the input sequential color video signal in lead 26 may be supplied to three channels in separator 19 and blanking signals derived from the field drive signals may be applied to the three channels so as to blank out the channels in sequence. The color pulses supplied to generator 19 may be employed to preserve proper color synchronization so that the signal supplied to output lead 23 always contains the red components, output lead 24 only the blue components, etc.

Figure 3:
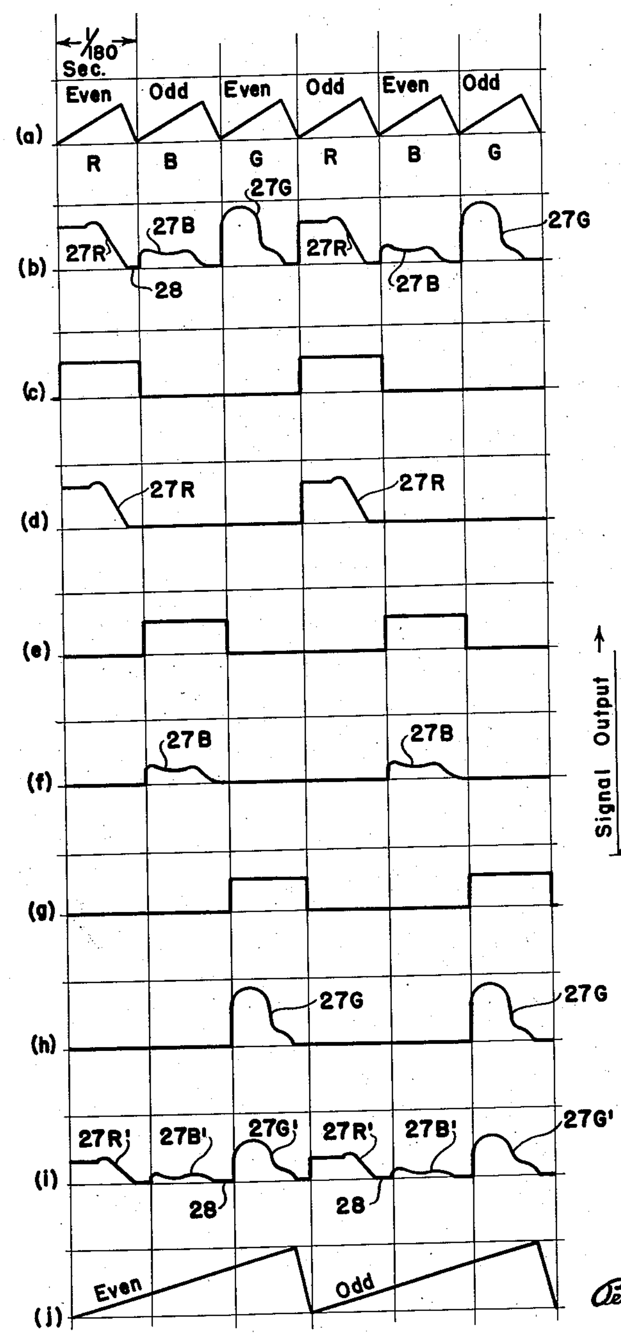
Fig. 3 shows certain wave forms in the system of Fig. 1.

The operation of the apparatus as described so far will be more clearly understood by reference to Fig. 3. Fig. 3*a* shows field scanning sawtooth waves as applied to deflection coil 15. Each field scansion is 1/180 second in duration and successive field scansions represent even and odd interlaces as indicated. With the three-color system assumed, successive field scansions correspond to red, blue and green aspects of the object field as indicated by the letters R, B and G.

Referring to Fig. 3*b*, during the first field scansion the even lines of the image are scanned to produce a red component as indicated at 27R. During this field scansion a red segment of the filter is interposed in the light path to the camera. At the end of the field scansion the video signal is blanked out as indicated at 28 by the composite blanking signal so that no signal is developed during the retrace of the field sawtooth wave. During the next field scansion the odd lines of the image are scanned to develop a signal representing the blue aspect of the object field as indicated at 27B. During the third field scansion the even lines are scanned to develop the green component as indicated at 27G. The process proceeds until at the end of six field scansions both odd and even lines have been scanned in each of the colors.

Assuming the color signal separator 19 contains three channels, to each of which the sequential color video signal is applied, Fig. 3*c* shows a blanking wave suitable for the red channel. This is applied in such polarity as to pass the video signal during the red scansions and to blank out the channel for the blue and green scansions. Thus the output contains only the red components 27R as shown in Fig. 3*d* and is supplied to line 23 (Fig. 1). Similarly, Fig. 3*c* shows a suitable blanking wave for the blue channel which allows the video signal to pass only during the blue field scansions to supply a signal to output lead 24 of the type shown in Fig. 3*f*. Similarly, the blanking wave shown in Fig. 3*g* may be applied to the green channel so that only green components such as shown in Fig. 3*h* are supplied to output lead 25. It will be understood that other means for separating the several color components from the sequential color video signal may be employed if desired.

Returning to Fig. 1, the red components of the sequential signal in lead 23 are supplied through an amplifier tube 29R and amplifier 31R to a cathode ray tube 32R for reproduction. Tube 29R is here shown as a triode with simple RC coupling to the succeeding amplifier 31R, but it will be understood that other type tubes such as pentodes, and different coupling networks may be employed if desired.

Similarly, the blue components in lead 24 are supplied through amplifier tube 29B and amplifier 31B to cathode ray tube 32B for reproduction.

Instead of treating the green components in similar fashion, in accordance with the present invention the green components are combined with selected amounts of red and blue components so as to permit obtaining the Y component of the NTSC system utilizing only a single scanning device at this point. To this end the green components in lead 25 are supplied to an amplifier tube 29G, as in the case of red and blue components. However, each of the amplifier tubes 29R, 29B, and 29G are provided with cathode potentiometers 33R, 33B, and 33G, respectively. The variable contacts of these potentiometers are connected respectively to the inputs of tubes 34R, 34B, and 34G. The outputs of these tubes are connected together and have a common output load 35. Thus the voltage wave across load 35 contains all three color components in sequence, and the relative magnitudes of the three components can be adjusted as desired by the potentiometers.

Fig. 3(*i*) shows the wave form across load 35 of Fig. 1. The color components are those of the Y signal and the proportions are selected to yield the proper ratio of components in the output of the system. At this point, however, the proportions may not be exactly those of the ultimate Y signal for reasons to be explained hereinafter.

The Y signal is the so-called luminance signal and in the NTSC standards carries all the information as to geometric picture detail. As is well known, the band width of the channel through which a video signal passes imposes limitations on the amount of detail which can be transmitted. However, as explained in an article entitled "A New Technique For Improving the Sharpness of Television Pictures" by Goldmark and Hollywood, Proceedings of the I. R. E., October, 1951, pages 1314–1322, a so-called crispening circuit can be employed to improve the sharpness of television pictures. In Fig. 1 the Y signal across resistor 35 is fed through a coupling circuit to a crispener circuit 36, and thence to amplifier 31Y which supplies the Y signal to the cathode ray tube 32Y. Thus the crispener circuit improves the character of the picture produced by tube 32Y. Of course, it can be omitted if desired.

The cathode ray beams in tubes 32R, 32B and 32Y are provided with respective deflection coils 37R, 37B and 37Y. These coils are supplied with line and field sawtooth scanning waves from scanning wave generator 18. It is important that the images on the tubes be as identical as possible in size and linearity. This is facilitated by supplying the deflection yokes in parallel from a single source, as indicated. Additional expedients known in the art may be employed in order to obtain as identical scanning patterns on the three tubes as possible. The scanning frequencies are the same as those employed for the pickup camera 11, and in this specific embodiment are 180 fields per second, 525 lines double-interlaced.

Cathode ray tubes such as 32R, 32B, 32Y commonly have a curved characteristic which results in a gamma considerably greater than unity in the transfer characteristic. To compensate for this gamma, as well as others which may be present in the system, the gamma control unit 21 is provided. Additional gamma control may be required in later stages, as will be mentioned.

Cooperating with cathode ray tubes 32R, 32B and 32Y are pickup scanning devices here shown as camera tubes 38R, 38B and 38Y, with associated projection lenses 39R, 39B and 39Y. These cathode ray tubes and associated camera tubes form the means for converting the sequential color video signal into signals meeting the NTSC specifications. The camera tubes are provided with respective deflection yokes 40R, 40B and 40Y. A synchronizing generator is indicated at 41 which develops vertical drive and horizontal drive pulses. The relationship between horizontal and vertical drives is selected to yield a 525-line, double-interlaced picture in accordance with conventional black-and-white standards. The vertical drive frequency is nominally 60 cycles, and the horizontal nominally 15,750 cycles. For reasons not necessary to discuss here, the actual values specified at the present time are 59.94 and 15734, respectively. The synchronizing generator 41 also develops composite blanking and composite synchronizing signals in the usual manner.

The vertical and horizontal drive pulses are supplied from generator 41 to the scanning wave generator 42 which develops sawtooth scanning waves and supplies them to the deflection yokes 40R, 40B and 40Y. As in the case of the cathode ray tubes, it is important that the scanning patterns of each of the camera tubes be as identical as possible, and this is facilitated by using generator 42 to supply deflection waves to the camera tubes in parallel. Further expedients known in the art may be employed to obtain scanning patterns of the same size and linearity.

The synchronizing generator 41 supplies vertical and horizontal drive, composite blanking and composite synchronizing signals to camera control units 43R, 43B and 43Y. These camera control units may follow conventional practice. They are supplied with video signals from respective camera tubes and in turn supply respective red, blue and Y video signals to the matrixor 44.

The operation of the signal converter unit will be understood more clearly by further reference to Fig. 3. The red components of the sequential color video signal are supplied to cathode ray tube 32R during a field scansion of 1/180 duration, as indicated in Fig. 3*d*. As shown in Fig. 3*j*, a field scansion by camera tube 38R takes place in approximately 1/60 of a second. Hence it takes three times as long for the camera tube to scan the face of the reproducing tube 32R as it takes for the picture to be initially produced thereon. By selecting a long persistence phosphor, such as willemite, the persistence of the image on the face of tube 32R is sufficient to develop a satisfactory signal at the output of camera tube 38R. Satisfactory operation is facilitated by operating the camera tube 38R at relatively low light levels so that it operates on substantially the linear portion of its characteristic.

Figure 6:
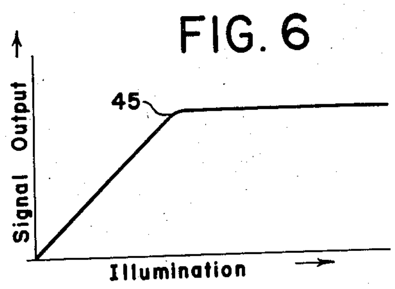
Fig. 6 represents an image orthicon characteristic.

A representative characteristic of an image orthicon is shown in Fig. 6. The linear portion of the characteristic extends from the origin to approximately point 45 on the curve, and it is found advantageous to confine the camera operation to this region. Suitable light levels may be obtained by proper selection of the cathode ray tube, operating potentials and the aperture of lens 39R. Adjustment of the latter is obtained by means of adjustable diaphragm 46R.

The above remarks concerning the red portion of the signal converter likewise apply to the blue portion and need not be repeated. In the Y portion the operation is similar except that in this case the picture reproduced on the face of cathode ray tube 32Y contains each color component reproduced successively. The signal applied to this tube is shown in Fig. 3*i*. Here again, it is found that by employing a long persistent phosphor in conjunction with the storage effect of the image orthicon, a satisfactory Y signal may be obtained at the output of tube 38Y.

Fig. 3 shows one phase relation between the nominally 60-cycle field scanning wave (Fig. 3*j*), which is applied to the converter camera tubes 38R, 38B and 38Y, and the 180-cycle field scanning waves of camera tube 11 and cathode ray tubes 32R, 32B, 32Y. It will be understood from the foregoing, however, that if the sequential field scanning is synchronized to the 60-cycle mains, and the NTSC field scanning rate is not synchronized to the 60-cycle mains, drifting will occur between field scansions of tubes 32R, etc., and tubes 38R, etc. This has not been found to be objectionable in practice. Also, even if the converter camera field scansions were synchronized to the 60-cycle mains, the phase relationship shown in Fig. 3 need not apply. It will be noted that the phase of the wave shown in Fig. 3*j* is different with respect to the waves shown in Figs. 3*d*, 3*f*, and 3*i*. Thus odd and even 60-cycle field scansions do not bear the same relationship to odd and even field scansions of the component reproduced colors. Nevertheless, due to the persistence of the phosphors employed and the storage effect of the image orthicons, satisfactory operation has been obtained in practice.

It will be understood that although the images on cathode ray tubes 32R, 32B, 32Y represent different color components, they may be in the same monochrome on each tube. Thus the spectral characteristics of the image orthicons may be the same as in black-and-white television.

It is possible to employ a scanning pattern at the camera tube 11 in which the lines are in the horizontal direction in accordance with conventional practice, and scanning at the converter camera tubes 38R, 38B and 38Y which are likewise with the lines in the horizontal direction in accordance with NTSC standards. However, it is found that beating may occur between the scanning lines which may be quite objectionable. While this beating effect may be reduced by careful selection of operating conditions, in accordance with a further aspect of the present invention it is proposed to scan the object field initially with the line scansions in the vertical direction. Thus the line scannng pattern at the camera tube 11 is advantageously as shown in Fig. 4.

Figure 4:
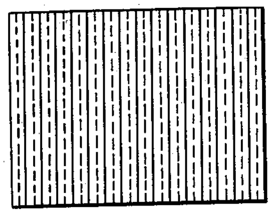
Figs. 4 and 5 show vertical and horizontal scanning line patterns suitable for use in the apparatus of Fig. 1.
Figure 5:
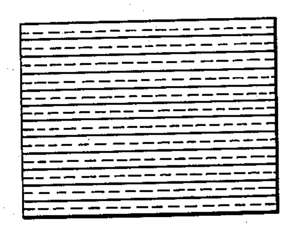

The line scanning pattern at cathode ray tubes 32R, 32B and 32Y is likewise in the vertical direction as shown in Fig. 4. However, the scanning pattern of camera tubes 38R, 38B and 38Y has the lines in the horizontal direction as shown in Fig. 5. In both cases interlaced scanning is depicted. Since the scanning lines for each pair of tubes in the converter section, for example, the tubes 32R and 38R, are at right angles to each other, beating and moire effects are greatly reduced.

As before mentioned, the video outputs of the converter camera tubes are supplied through respective camera control units to the matrixor 44. In matrixor 44 the signals are combined in suitable manner by addition and subtraction to yield the NTSC signals Y, Q and I mentioned hereinbefore. Filters for the Q and I components may be provided before matrixing, as will be understood. Details of such circuits have been described in the literature and need not be discussed here. Before combining the Y, B and R signals to obtain Y, Q and I signals it is desirable to correct the Y, B and R signals for gamma, and it is also important that the proportions of the Y signals be correct.

Dealing first with the proportions of the Y signal, as has been mentioned hereinbefore, a cathode ray picture tube such as 32Y has a curved input vs. light characteristic corresponding to a gamma of considerably greater than unity. Hence, if the red, blue and green components of the sequential video signal are supplied to the grid of 32Y in the ratios of the Y signal, namely, 0.59G, .30R and 0.11B, the curvature of the cathode ray tube characteristic in conjunction with the transfer characteristic of the camera tube 38Y will ordinarily not yield the proper proportions for the Y signal in the camera output. However, this situation can be corrected by altering the settings of potentiometers 33R, 33B and 33G until the Y signal at the output of camera tube 38Y has the proper relative proportions of red, blue and green components.

In order to take into account the gamma of the cathode ray tubes at the receivers, it is customary to provide gamma correction at the transmitter. Thus camera control units 43R, 43B and 43Y may include gamma correction circuits for this purpose, so that the Y, B and R signals supplied to matrixor 44 are gamma corrected. The matrixor then combines these signals in the proper proportions to obtain the Y, Q, and I output signals indicated.

The outputs of the matrixor 44 are supplied to modulator and transmitter stages. Fig. 2 shows one such arrangement comprising a sub-carrier generator 47 whose frequency is selected, in accordance with the NTSC standards as a harmonic of one-half the line frequency. As presently specified, this sub-carrier is approximately 3.58 megacycles. The sub-carrier frequency is supplied in phase quadrature to sub-carrier modulators 48 and 49. The Q signal from matrixor 44 is supplied to sub-carrier modulator 48 and the I signal is supplied to sub-carrier modulator 49. The quadrature components of the sub-carrier frequency are amplitude modulated by the Q and I signals in respective modulators. The outputs of the modulators are then combined with the Y signal in adder 49, and the combined signals supplied to a television transmitter as indicated.

As presently contemplated the Y signal, representing the luminance of the object field, is transmitted as an amplitude modulation of the transmitted carrier in the same manner as conventional black-and-white transmission. The quadrature sub-carriers, modulated by the Q and I signals, are likewise transmitted as amplitude modulations of the main carrier. At a conventional black-and-white receiver the Q and I signal components are rendered ineffective by the integration characteristics of the eye, and only the Y modulation is effective. In a color receiver, the Y component provides the principal detail of the picture, and the Q and I components are utilized to add color.

An important feature of the system of the present invention is that the Y component, which transmits detail to either black-and-white or color receivers, is scanned at each stage by only a single scanning device. Thus, all components which go to make up the Y signal are initially scanned by the camera tube 11 having a single deflection system. At the conversion stage, all components of the Y signal are reproduced by a single cathode ray tube 32Y and picked up by a single camera tube 38Y. Thus problems of misregistration in connection with the Y signal are completely avoided. This is a distinct advantage since misregistration in the components of the Y signal will inevitably result in decrease in detail.

The use of vertical line scanning at the camera tube 11 may result in some loss of detail over that obtained in normal black-and-white transmission if 525 lines per frame are employed. This could be avoided by employing a higher number of lines per frame. However, even with 525 lines it is considered that the loss in detail due to the initial scanning is less than that lost in systems employing three camera tubes where misregistration is exceedingly difficult to avoid. Furthermore, the arrangement of the present invention provides a far simpler camera which is much less costly and easier to maintain than cameras employing three pickup tubes.

To improve detail in the horizontal direction, a crispener circuit may be inserted in the Y signal channel as shown by dotted block 60. As before pointed out, crispener 36 improves line detail in the Y picture on cathode ray tube 32Y. Assuming vertical line scanning at camera tube 11, the lines on tube 32Y will be vertical and thus the vertical detail in the picture will be improved, with resultant benefit to the vertical detail in the output of converter camera 38Y. Crispener 60 improves line detail in the output signal from tube 38Y, and since the lines in tube 38Y are horizontal an improvement in horizontal detail is obtained. The overall result is that the Y signal output of the apparatus of Fig. 1 is capable of yielding a picture of excellent detail.

For test purposes, and to facilitate adjustment, it is desirable to have available a green signal at the output of the converter unit. To this end the input of crispener circuit 36 may be switched from the Y output across load 35 to the G output from tube 29G as indicated. When the switch is used, the output of converter camera tube 38Y will be the green component. Suitable test equipment and monitoring equipment may then be connected into circuit as desired. However, in actual transmission the Y component will be fed through the crispener circuit 36 to cathode ray tube 32Y as shown in full lines.

Since the channels from separator 19 on in Fig. 1 are separate for different color components, suitable delay lines may be introduced as required so that the outputs have the correct phase relationships.

In the system shown in Fig. 1, problems may arise due to changes in the D. C. levels of the outputs of the color signal separator 19. Such changes may result from temperature variations, line voltage variations, etc.

Figures 7, 8, 11:
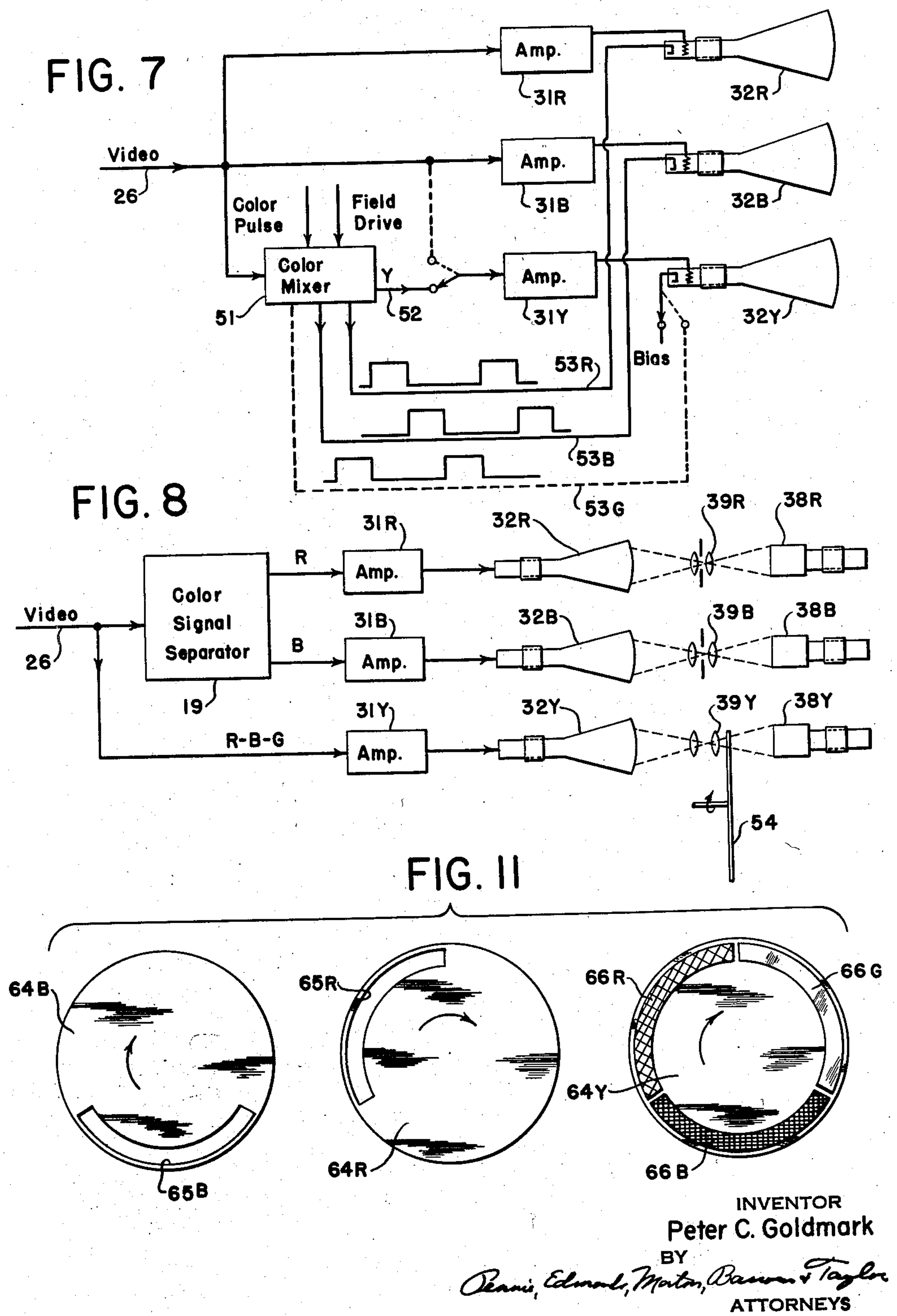
Fig. 7 is a diagram showing a modification of the arrangement of Fig. 1.
Fig. 8 shows another modification of the arrangement of Fig. 1.
Fig. 11 shows suitable disc arrangements for the apparatus of Fig. 10.

Fig. 7 shows a modification which is less susceptible to such variations. In this modification the sequential color video signal in line 26 of Fig. 1 is supplied directly to amplifiers 31R and 31B and thence to the grids of cathode ray tubes 32R and 32B. However, the cathodes of tubes 32R and 32B are blanked out during the field intervals of other colors, as will be described.

The sequential color video signal is supplied also to color mixer 51, which may follow the principles described in the Goldmark et al. article, supra, and also in my Patent No. 2,406,760, granted September 3, 1946. Field drive and color pulses may be supplied to color mixer 51 from generators 17 and 18 of Fig. 1. In the color mixer the relative magnitudes of red, blue and green components may be altered as desired. Hence the output of the color mixer at lead 52 contains components of all three colors whose relative magnitudes may be adjusted to give the correct proportions for the Y signal at the output of the system as described hereinbefore. The Y signal in lead 52 is supplied through amplifier 31Y to the grid of cathode ray tube 32Y. Camera tubes 38R, 38B and 38Y, with corresponding lenses, are associated with the cathode ray tubes as described in connection with Fig. 1. Subsequent components may be the same.

In the color mixer 51 three channels are assumed for the sequential color video signal, and blanking signals as represented in Figs. 3*c*, 3*e* and 3*g* are developed in order to pass the red, blue and green signal components in respective channels, and blank out the remaining color signal components. The blanking signal for the red channel of the color mixer 51 is also supplied through lead 53R to the cathode of tube 32R. Thus tube 32R reproduces pictures only for the red component of the composite sequential signal. Similarly, the blanking wave for the blue channel is supplied through lead 53B to the cathode of tube 32B so that that tube reproduces only blue signals. However, the output of the color mixer 51 is supplied through amplifier 31Y to the grid of cathode ray tube 32Y, so that the respective components (such as shown in Fig. 3*i*) are reproduced in sequence on the face of the tube.

For test and adjustment purposes, the initial sequential video signal may be supplied to the input of amplifier 31Y by the switch and dotted connection shown. In such case a blanking wave corresponding to the green components of the sequential video signal may be supplied through dotted lead 53G to the cathode of tube 32Y, a switch as shown being provided for this purpose. In normal operation, the switch is in the position shown in full lines, so that the cathode bias of tube 32Y remains unchanged during reproduction of all three color components.

In connection with Fig. 1 it was pointed out that the characteristic of tube 32Y was curved (gamma greater than unity) and that the relative proportions of the red, blue and green components of the Y signal supplied thereto were in general not the same as those in the output of camera tube 38Y. While it has been found that proper adjustment of potentiometers 33R, 33B and 33G will give very satisfactory results, the arrangement shown in Fig. 8 may be employed to avoid this difficulty.

In Fig. 8, the sequential color video signal in line 26 is supplied to the color signal separator 19, which may be the same as that shown in Fig. 1 except that the green component output is not utilized. The red and blue components are fed through amplifiers 31R, 31B to respective cathode ray tubes 32R, and 32B in the same manner as in Fig. 1. However, the complete sequential color video signal is supplied to amplifier 31Y and thence to cathode ray tube 32Y. Camera tubes 38R, 38B and 38Y with associated lenses are provided as in Fig. 1.

Figure 9:
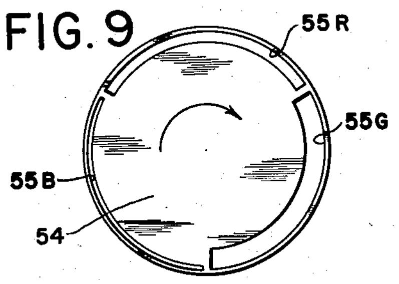
Fig. 9 is a face view of a disc for use with the modification of Fig. 8.

In order to alter the relative proportions of red, blue and green signal components to obtain the Y signal, a rotating disc 54 is provided in the light path between cathode ray tube 32Y and the camera tube 38Y. The construction of this disc is shown in Fig. 9. As there shown, a slot 55G is provided on the periphery of the disc and passes in front of lens 39Y so as to allow a selected amount of light to pass to camera tube 38Y during the green field scansion. Slot 55R is provided to allow a predetermined amount of light to pass to camera tube 38Y during the red scansion, and slot 55B similarly operates during the blue field scansion. The radial widths of the slots are proportioned to give the desired relative magnitudes of the color components for the Y signal.

As previously pointed out, the gamma control unit 21 (Fig. 1) may be adjusted to compensate for the curved characteristic of the cathode ray tubes 32R, 32B and 32Y. Since the color signal components for white light are of substantially the same amplitude at the grid of tube 32Y, the curved characteristic produces substantially the same effect for each color component. The subsequent alteration of the amount of light falling on camera tube 38Y for the different components changes the relative proportions of the component color signals free of any inaccuracies dues to the curved characteristic of 32Y. Subsequent gamma correction for the outputs of tubes 38R, 38B and 38Y may of course be employed to compensate for the gamma of receiver tubes, as described in connection with Fig. 1.

As has been described in connection with Fig. 1, the storage characteristics of image orthicon tubes, when combined with long persistent phosphors for the cathode ray tubes in the signal converter, have been found to give satisfactory results. However, camera tubes of the vidicon type have much longer storage periods than the image orthicon. Such tubes, as is well known, employ photoconductive surfaces for the light-sensitive element, rather than photo-emissive surfaces as in the image orthicon. The employment of tubes having longer storage periods, such as those of the vidicon type, permits the use of faster decay phosphors.

Thus, if desired, cathode ray tubes with faster decay phosphors, and pickup scanning devices of the vidicon type may be employed in the signal converter section of Fig. 1. They may also be employed in the modifications of Figs. 7 and 8. In Fig. 8 such tubes may be particularly advantageous since faster decay phosphors will permit disc 54 to control more precisely the relative amounts of red, blue and green component light falling on camera tube 38Y.

Figure 10:
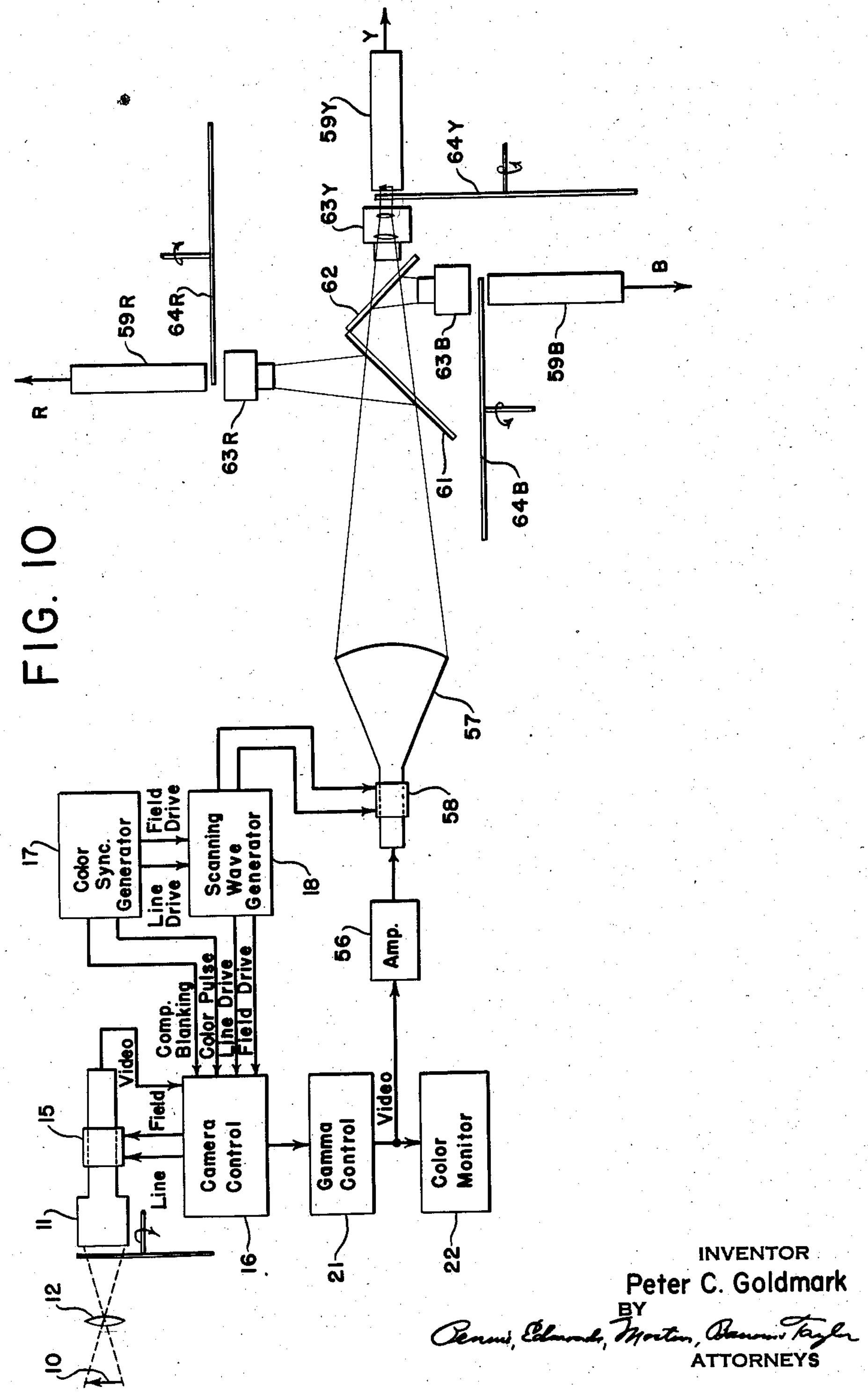
Fig. 10 is a diagram showing another embodiment of the invention.

Fig. 10 shows a further embodiment of the invention employing as signal converter a single cathode ray tube with a relatively fast decay phosphor and tubes of relatively long storage times such as those of the vidicon type.

In Fig. 10 the sequential pickup components are the same as in Fig. 1 and are numbered accordingly. However, the output of the gamma control unit 21 is supplied directly through amplifier 56 to the cathode ray tube 57. Scanning yoke 58 is supplied with sawtooth deflecting waves at the sequential color video frequencies by the scanning wave generator 18. Relatively fast decay phosphors may be used on the face of tube 57.

A plurality of camera tubes 59R, 59B and 59Y of the vidicon type are provided to develop video signals from the images on tube 57. An optical arrangement is provided in order to enable each camera tube to scan the images on tube 57. In Fig. 10 this is shown as a simple arrangement of a front surface reflecting mirror 61 which reflects a portion of the light from tube 57 to camera tube 59R. The remainder of the light passes through mirror 61 and impinges on a second front surface mirror 62 which reflects a portion to camera tube 59B. The remainder passes through mirror 62 and impinges on tube 59Y.

Lenses 63R, 63B and 63Y are provided to focus images on the face of cathode ray tube 57 onto the photo-sensitive surfaces of respective tubes 59R, 59B and 59Y. It will be understood that suitable optical correcting elements may be introduced in the paths of light to the respective camera tubes, and that any other suitable optical arrangement may be employed as desired.

In order to pass light corresponding only to the red aspects of the object field to camera tube 59R, and light corresponding only to the blue aspects to tube 59B, shutter discs 64R and 64B are provided. These are shown more fully in Fig. 11. As there shown, disc 64R is provided with an open slot 65R which extends approximately one-third around the periphery of the disc. Thus, during one-third of the rotation the camera tube 59R is exposed to light from cathode ray tube 57. Similarly, disc 64B is provided with a slot 65B which exposes camera tube 59B to light for only one-third of the disc rotation. Discs 64R and 64B are driven by suitable means (not shown) in synchronous and proper phase with respect to the corresponding sequential color field scansions so that only light corresponding to red aspects passes to tube 59R and light corresponding only to blue aspects passes to tube 59B.

Disc 64Y is also shown in Fig. 11 and is provided with three slots each extending nearly 120 degrees around the periphery and labeled 66R, 66B and 66G. The transmission characteristics of these slots is proportioned to give the desired relative color components for the Y signal. For example, slot 66G may be left open or covered with transparent material, slot 66R covered with a neutral density filter to give the desired ratio of red component, and slot 66B covered with a neutral density filter to give the desired ratio of blue component. For example, if slot 66G is completely open (100% transparent), slot 66R may be 51% transparent, and slot 66B 18.7% transparent. In this manner the output of tube 59Y represents the Y component of the television signal as described in connection with the output of tube 38Y in Fig. 1. The outputs of tubes 59R, 59B and 59Y may be supplied through suitable gamma correcting circuits to a matrixor such as 44 in Fig. 1.

Suitable deflection coils are provided for tubes 59R, 59B, and 59Y and energized at line and field scanning frequencies in the same manner as tubes 38R, 38B and 38Y in Fig. 1. The line scanning direction will normally be in the horizontal direction in accordance with present standards. The longer storage time of tubes of the vidicon type permits the employment of line scanning at the initial pick-up tube 11 in the horizontal direction with less difficulty due to beating and moire effects. However vertical line scanning at tube 11, as described in connection with Fig. 1, may be employed to reduce such effects still further.

It will be noted that in each of the embodiments described the color components which make up the Y luminance signal are scanned at each stage by only a single scanning device. This has been pointed out in detail for Fig. 1. No problems of misregistration of scanning patterns are presented in connection with the Y signal, and this is a marked advantage since it is this signal which carries the principal information concerning geometric detail. The modifications shown in Figs. 7 and 8 are similar in respect to reproduction of components of the Y signal by a single scanning device at each stage of the apparatus.

In Fig. 10 the initial color components are developed by a single scanning device 11 and reproduced by a single cathode ray tube 57. All three components are scanned by pick-up tube 59Y, with relative magnitudes altered to yield a suitable Y signal by disc 64Y. Thus the same advantages of freedom from misregistration are present in this embodiment also.

In the NTSC standards which have been described herein the proportions of the Y signal are selected so that it yields a so-called constant luminance signal and carries all the information as to geometric detail, the signals I and Q providing information concerning color only. However, it will be understood that the proportions of the Y signal may be altered to give other than constant luminance without departing from the spirit of the present invention.

In each of the embodiments described, switching means is employed to present images representing different color components to different scanning devices in the signal converter section, and means are also provided for supplying a plurality of different color components to at least one of the pick-up devices in the signal converter section. Provision is also made to alter the relative image intensities of different color components supplied to the latter pick-up device so that the relative values of the color components of the Y signal are different from that of the initial sequential color video signal.

Both electrical and optical switching means have been described, as well as different ways of employing either type of switching. It will be understood that other switching arrangements may be employed if desired. The alteration of the balance of color components required to yield the Y signal may be effected by electrical or optical means, as described, or by other suitable means.

In the embodiments described the signal converter employs cathode ray tubes which present light images to light-sensitive storage pickup devices for rescanning. Suitable tubes for the purpose are fairly readily available and have been found satisfactory in practice. Tubes of the image orthicon and vidicon types have been specifically mentioned since they have numerous advantages, but other suitable tubes may be employed if desired. Also, signal converters employing charge images, rather than light images, may be usable in specific applications.

The use of initial vertical line scanning and subsequent horizontal line rescanning has been described specifically in connection with apparatus for the initial development and subsequent conversion of color television signals. However, this feature of the invention is of broad applicability and in general may be utilized whenever it is desired to reproduce an image from a television signal and then rescan the image to develop another television signal.

Many additional modifications and variations will occur to those skilled in the art, and in suitable cases certain features of the invention may be employed while omitting other features.

I claim:

1. Apparatus for developing color television signals which comprises a sequential color pickup camera for developing a sequential color video signal of which successive portions represent different color components of an object field, signal reproducing means including at least one cathode-ray tube for reproducing from said color video signal images corresponding to said successive portions in sequence, a plurality of pickup scanning devices associated with said signal reproducing means for producing video signals from said images, switching means presenting images representing different color components to different scanning devices to thereby develop respective video signals representing different color components, and means supplying portions of said sequential color video signal representing a plurality of different color components to at least said one cathode-ray tube to produce sequentially thereon images corresponding to different color components, one of said scanning devices responding to the images on said one cathode-ray tube to develop a corresponding video signal representing a plurality of color components.

2. Apparatus for developing color television signals which comprises a sequential color pickup camera for scanning an object field at line and field frequencies to develop a sequential color video signal of which successive portions represent different color components, signal reproducing means including at least one cathode-ray tube for reproducing from said color video signal images corresponding to said successive portions in sequence, a plurality of storage pickup scanning devices associated with said signal reproducing means for producing video signals from said images, deflection means for deflecting said scanning devices at common line and field frequencies with the field frequency substantially lower than that of said sequential camera, switching means presenting images representing different color components to different scanning devices to thereby develop respective video signals representing different color components, and means supplying portions of said sequential color video signal representing a plurality of different color components to at least said one cathode-ray tube to produce sequentially thereon images corresponding to different color components, one of said scanning devices responding to the images on said one cathode-ray tube to develop a corresponding video signal representing a plurality of color components.

3. Apparatus for developing color television signals which comprises a three-color field sequential color pickup camera for scanning an object field at line and field frequencies to develop a field sequential color video signal of which successive portions represent successive field scansions in different primary colors, signal reproducing means including at least one cathode-ray tube for reproducing from said color video signal images corresponding to said successive portions in sequence, deflection means for said signal reproducing means operating in synchronism with said camera and at like line and field frequencies, a plurality of storage pickup scanning devices associated with said signal reproducing means for producing video signals from the said images thereon, deflection means for deflecting said scanning devices at common line and field frequencies with the field frequency substantially lower than that of said sequential camera, switching means presenting images representing only one color component to one of said scanning devices and only another color component to another scanning device, means supplying portions of said sequential color video signal representing a plurality of different color components to at least said one cathode-ray tube to produce sequentially thereon images corresponding to different color components, a third of said scanning devices responding to the images on said one cathode-ray tube to develop a corresponding video signal representing a plurality of color components, and means for altering the relative image intensities of different color components to which said third scanning device responds.

4. Apparatus for developing color television signals which comprises a sequential color pickup camera for developing a sequential color video signal of which successive portions represent different color components of an object field, signal reproducing means including at least one cathode-ray tube for reproducing from said color video signal images corresponding to said successive portions in sequence, a plurality of pickup scanning devices associated with said signal reproducing means for producing video signals from said images, switching means presenting images representing different color components to different scanning devices to thereby develop respective video signals representing different color components, means supplying portions of said sequential color video signal representing a plurality of different color components to at least said one cathode-ray tube to produce sequentially thereon images corresponding to different color components, one of said scanning devices responding to the images on said one cathode-ray tube to develop a corresponding video signal representing a plurality of color components, means for modulating a radio frequency carrier with the video signal from said one scanning device, and means utilizing the outputs of other of said scanning devices to modulate a subcarrier transmitted on said carrier.

5. Apparatus for developing color television signals which comprises a sequential color pickup camera for developing a sequential color video signal of which successive portions represent different color components of an object field, a plurality of cathode-ray tubes for reproducing from said color video signal images corresponding to said successive portions in sequence, switching means supplying signals representing different color components to different cathode-ray tubes, at least one of said cathode-ray tubes being supplied with video signal portions representing a plurality of different color components, and a plurality of pickup scanning devices associated with respective cathode-ray tubes for producing respective video signals from images thereon.

6. Apparatus for developing color television signals which comprises a field sequential color pickup camera for scanning an object field at line and field frequencies to develop a field sequential color video signal of which successive portions represent successive field scansions in different color components, a plurality of cathode-ray tubes for reproducing from said color video signals images corresponding to successive field scansions, switching means synchronized with said field scansions for supplying signals representing different color components to different cathode-ray tubes, at least one of said cathode-ray tubes being supplied with video signal portions representing a plurality of different color components, a plurality of storage pickup scanning devices associated with respective cathode-ray tubes for producing respective video signals from images thereon, deflection means for deflecting said scanning devices at common line and field frequencies with the field frequency substantially lower than that of said sequential camera, and means for sequentially altering the relative image intensities of different color components effective at the scanning device associated with said one cathode-ray tube to yield a respective output video signal whose color components have relative values different from those in the initial sequential signal.

7. Apparatus for developing color television signals which comprises a field sequential color pickup camera for scanning an object field at line and field frequencies to develop a field sequential color video signal of which successive portions represent successive field scansions in different primary colors, a plurality of cathode-ray tubes for reproducing from said color video signals images corresponding to said successive field scansions, deflection means for deflecting said cathode-ray tubes in synchronism with said camera and at like line and field frequencies, switching means synchronized with said field scansions for supplying signals representing different color components to different cathode-ray tubes, said switching means including means for producing a sequential color video signal similar to the initial color video signal but of altered balance between the color components, said signal of altered balance being supplied to one of said cathode-ray tubes, a plurality of storage pickup scanning devices associated with respective cathode-ray tubes for producing respective video signals from images thereon, and deflection means for deflecting said scanning devices at common line and field frequencies with the field frequency substantially lower than that of said sequential camera.

8. Apparatus for developing color television signals which comprises a double interlaced three-color field sequential color pickup camera for scanning an object field at line and field frequencies to develop a field sequential color video signal of which successive portions represent successive interlaced field scansions in different primary colors, three cathode-ray tubes for reproducing images from said color video signal, deflection means for deflecting said cathode-ray tubes in synchronism with said camera and at like line and field frequencies, electronic switching means synchronized with said field scansions for supplying signals representing only one color component to one cathode ray tube and only another color component to another tube, said switching means including means for producing a sequential color video signal similar to the initial color video signal but of altered balance between the color components, said signal of altered balance being supplied to the third cathode-ray tube, three storage pickup scanning devices associated with respective cathode-ray tubes for producing respective video signals from images thereon, and deflection means for deflecting said scanning devices at common line and field frequencies in a double-interlaced scanning pattern with the field frequency approximately one-third that of said sequential camera.

9. Apparatus for developing color television signals which comprises a sequential color pickup camera for developing a sequential color video signal of which successive portions represent different color components of an object field, a plurality of cathode-ray tubes for reproducing from said color video signal images corresponding to said successive portions in sequence, switching means supplying signals representing different color components to different cathode-ray tubes, said sequential color video signal being supplied to one of said cathode-ray tubes, a plurality of pickup scanning devices and respective lenses associated with respective cathode-ray tubes for producing respective video signals from images thereon, light control means interposed in the path of light from said one cathode-ray tube to the respective scanning device and adapted to pass different percentages of image light, said light control means being synchronized with said one cathode-ray tube to pass different percentages of light to the scanning device during the reproduction of different color components.

10. Apparatus for developing color television signals which comprises a field sequential color pickup camera for scanning an object field at line and field frequencies to develop a color video signal of which successive portions represent field scansions in different primary colors, a plurality of cathode-ray tubes for reproducing from said color video signal images corresponding to said field scansions, deflection means for said plurality of cathode-ray tubes operating in synchronism with said camera and at like line and field frequencies, switching means supplying signals representing different color components to different cathode-ray tubes, said sequential color video signal being supplied to one of said cathode-ray tubes, a plurality of storage pickup scanning devices and respective lenses associated with respective cathode-ray tubes for producing respective video signals from images thereon, deflection means for deflecting said scanning devices at common line and field frequencies with the field frequency substantially lower than that of said sequential camera, a rotating element interposed in the path of light from said one cathode-ray tube to the respective scanning device and having segments passing different percentages of image light, said rotating element being synchronized with the field scansions of said one cathode-ray tube to pass different percentages of light to the respective scanning device during successive field scansions representing different color components.

11. Apparatus for developing color television signals which comprises a sequential color pickup camera for developing a sequential color video signal of which successive portions represent different color components of an object field, a cathode-ray tube supplied with said sequential color video signal for reproducing therefrom images corresponding to said successive portions in sequence, a plurality of pickup scanning devices for producing video signals from images on said cathode-ray tube, switching means rendering said scanning devices operable to scan respectively different color component images on said cathode-ray tube, said switching means rendering one of said scanning devices operable to scan a plurality of different color component images on said cathode-ray tube.

12. Apparatus for developing color television signals which comprises a field sequential color pickup camera for scanning an object field at line and field frequencies to develop a color video signal of which successive portions represent field scansions in different primary colors, a cathode-ray tube supplied with said sequential color video signal for reproducing images therefrom, deflection means for deflecting said cathode-ray tube in synchronism with said camera and at like line and field frequencies, a plurality of storage pickup scanning devices and associated optical means for producing video signals from images on said cathode-ray tube, deflection means for deflecting said scanning devices at common line and field frequencies with the field frequency substantially lower than that of said sequential camera, light control means in the paths of light to respective scanning devices synchronized to expose different scanning devices to different component color images on said cathode-ray tube, the light control means in the path of light to one of said scanning devices being synchronized and adapted to expose said one scanning device to a plurality of different color component images on said cathode-ray tube.

13. Apparatus for developing color television signals which comprises a field sequential color pickup camera for scanning on object field at line and field frequencies to develop a color video signal of which successive portions represent field scansions in different primary colors, a cathode-ray tube supplied with said sequential color video signal for reproducing images therefrom, deflection means for deflecting said cathode-ray tube in synchronism with said camera and at like line and field frequencies, a plurality of storage pickup scanning devices and associated optical means for producing video signals from images on said cathode-ray tube, deflection means for deflecting said scanning devices at common line and field frequencies with the field frequency substantially lower than that of said sequential camera, a plurality of rotatable elements having light transmitting segments interposed in the paths of light from said cathode-ray tube to respective scanning devices and driven synchronously with the cathode-ray tube field scansions, the segments of different rotatable elements being designed and phased to pass light of different color components to different scanning devices, one of said rotatable elements having a plurality of segments passing light during field scansions of a plurality of different color component images to the respective scanning device, said plurality of segnemts being designed and adapted to pass different percentages of image light during respective field scansions.

14. Apparatus for developing color television signals which comprises a sequential color pickup camera for scanning an object field at line and field frequencies to develop a color video signal of which successive portions represent different color components, the line scanning being in substantially the vertical direction of said object field, signal reproducing means including at least one cathode-ray tube for reproducing from said color video signals images corresponding to said successive portions in sequence, said images being reproduced in synchronism with said camera and at like line and field frequencies, a plurality of storage pickup scanning devices associated with said signal reproducing means for producing video signals from said images, deflection means for deflecting said scanning devices at common line and field frequencies with the field frequency substantially lower than that of said sequential camera, the direction of line scanning being substantially perpendicular to the lines of the images being scanned, switching means presenting images representing different color components to different scanning devices to thereby develop respective video signals representing different color components, and means supplying portions of said sequential color video signal representing a plurality of different color components to at least said one cathode-ray tube to produce sequentially thereon images corresponding to different color components, one of said scanning devices responding to the images on said one cathode-ray tube to develop a corresponding video signal representing a plurality of color components.

15. Apparatus for developing color television signals as described in claim 14, comprising crispening means for improving line detail in both of said directions of line scanning for at least said corresponding video signal representing a plurality of color components.

16. Apparatus for developing color television signals as described in claim 14, comprising first crispening means for improving line detail in at least said portions of said sequential color video signal representing a plurality of different color components and second crispening means for improving line detail in at least said corresponding video signal representing a plurality of color components.

References Cited in the file of this patent

UNITED STATES PATENTS

| | | |
|---|---|---|
| 2,534,610 | Marcy | Dec. 19, 1950 |
| 2,545,957 | Kell | Mar. 20, 1951 |
| 2,587,005 | Smith | Feb. 26, 1952 |
| 2,587,006 | Smith | Feb. 26, 1952 |
| 2,652,449 | Graham | Sept. 15, 1953 |
| 2,657,255 | Wintringham | Oct. 27, 1953 |

FOREIGN PATENTS

| | | |
|---|---|---|
| 928,783 | France | Dec. 8, 1947 |